(12) United States Patent
Saxe et al.

(10) Patent No.: US 6,936,193 B2
(45) Date of Patent: Aug. 30, 2005

(54) SUSPENDED PARTICLE DEVICE LIGHT VALVE FILM

(75) Inventors: Robert L. Saxe, New York, NY (US); Steven M. Slovak, Massapequa, NY (US); Srinivasan Chakrapani, Commack, NY (US); Matthew Forlini, Howard Beach, NY (US)

(73) Assignee: Research Frontiers Incorporated, Woodbury, NY (US)

( * ) Notice: Subject to any disclaimer, the term of this patent is extended or adjusted under 35 U.S.C. 154(b) by 44 days.

(21) Appl. No.: 10/412,983

(22) Filed: Apr. 14, 2003

(65) Prior Publication Data

US 2004/0201001 A1 Oct. 14, 2004

(51) Int. Cl.[7] .................. C09K 19/00; G02B 26/00; G02F 1/00; G02F 1/1335
(52) U.S. Cl. .................. 252/583; 349/16; 349/33; 359/253; 359/296; 428/1.2; 428/1.5; 525/176
(58) Field of Search .................. 252/583; 349/16, 349/33; 359/253, 296; 428/1.2, 1.5; 525/176

(56) References Cited

U.S. PATENT DOCUMENTS

| | | | |
|---|---|---|---|
| 4,247,175 A | 1/1981 | Saxe | 350/362 |
| 4,407,565 A | 10/1983 | Saxe | 350/374 |
| 4,772,103 A | 9/1988 | Saxe | 350/362 |
| 5,409,734 A | 4/1995 | Lee et al. | 427/163.1 |
| 5,461,506 A | 10/1995 | Check, III et al. | 359/296 |
| 5,463,491 A | 10/1995 | Check, III | 359/296 |
| 5,463,492 A | 10/1995 | Check, III | 359/296 |
| 6,114,405 A * | 9/2000 | Zhuang et al. | 522/99 |
| 6,416,827 B1 * | 7/2002 | Chakrapani et al. | 428/1.31 |

OTHER PUBLICATIONS

Lambent Technologies (Norcross Division)—Product Guide (2003).

* cited by examiner

*Primary Examiner*—Randy Gulakowski
*Assistant Examiner*—Timothy J. Kugel
(74) *Attorney, Agent, or Firm*—Ostrolenk, Faber, Gerb & Soffen, LLP

(57) ABSTRACT

A film suitable for use as a light-modulating unit of a suspended particle device light valve, comprising a plurality of particles dispersed in a liquid suspending medium, distributed within an optionally crosslinked matrix polymer. The suspending medium is substantially immiscible with the matrix polymer, has a boiling point greater than about 100° C., has an electrical resistivity of at least about $0.8 \times 10^6$ ohms per square, and has an in endex of refraction at 25° C. which differs from that of the matrix polymer by no more than about 0.002.

24 Claims, No Drawings

SUSPENDED PARTICLE DEVICE LIGHT VALVE FILM

FIELD OF THE INVENTION

The present invention is directed to improved films for use in suspended particle devices such as light valves. More particularly, the invention relates to new suspending media for use in forming such films and to light valves incorporating the improved films of the invention.

BACKGROUND

Light valves have been known for more than sixty years for modulation of light. Light valves have been proposed for use in numerous applications during that time including, e.g., alphanumeric displays, television displays, windows, sunroofs, sunvisors, mirrors, eyeglasses and the like to control the amount of light passing therethrough. Light valves of the type described herein are also known as "suspended particle devices" or "SPDs".

As used herein, the term "light valve" is used to describe a cell formed of two walls that are spaced apart by a small distance, with at least one wall being transparent. The walls have electrodes thereon, usually in the form of transparent electrically conductive coatings. The cell contains a light-modulating element (sometimes herein referred to as an "activatable material"), which may be either a liquid suspension of particles or a plastic film in which droplets of a liquid suspension of particles are distributed.

The liquid suspension (sometimes herein referred to as "a liquid light valve suspension" or as "a light valve suspension") comprises small particles suspended in a liquid suspending medium. In the absence of an applied electrical field, the particles in the liquid suspension assume random positions due to Brownian movement. Hence a beam of light passing into the cell is reflected, transmitted or absorbed, depending upon the cell structure, the nature and concentration of the particles and the energy content of the light. The light valve is thus relatively dark in the OFF state. However, when an electric field is applied through the liquid light valve suspension in the light valve, the particles become aligned and for many suspensions most of the light can pass through the cell. The light valve is thus relatively transparent in the ON state.

For many applications, it is preferable for the activatable material, i.e., the light modulating element, to be a plastic film rather than a liquid suspension. For example, in a light valve used as a variable light transmission window, a plastic film in which droplets of liquid suspension are distributed is preferable to a liquid suspension alone because hydrostatic pressure effects, e.g., bulging associated with a high column of liquid suspension, can be avoided through use of a film, and the risk of possible leakage can also be avoided. Another advantage of using a plastic film is that, in a plastic film, the particles are generally present only within very small droplets and, hence, do not noticeably agglomerate when the film is repeatedly activated with a voltage.

A "light valve film" as used herein refers to a film having droplets of a liquid suspension of particles distributed in the film or in part of the film.

U.S. Pat. No. 5,409,734 exemplifies a type of light valve film that is made by phase separation from a homogeneous solution. Light valve films made by cross-linking emulsions are also known. See U.S. Pat. Nos. 5,463,491 and 5,463,492, both of which are assigned to the assignee of the present invention.

To facilitate a better understanding of suspended particle devices produced in accordance with the present invention, a brief description is provided below of the features of SPD light valves formed in accordance with the prior art.

A variety of liquid light valve suspensions are well-known in the art and such suspensions are readily formulated according to techniques well known to one of ordinary skill therein. The term "liquid light valve suspension" as used herein means a "liquid suspending medium" in which a plurality of small particles are dispersed. The "liquid suspending medium" comprises one or more non-aqueous, electrically resistive liquids in which there is preferably dissolved at least one type of polymeric stabilizer which acts to reduce the tendency of the particles to agglomerate and to keep them dispersed and in suspension.

Subject to certain limitations discussed hereinafter, the liquid suspending media useful in suspended particle devices prepared in accordance with the present invention may optionally include, i.e., in addition to one or more of the new liquid suspending media described herein, one or more "prior art" liquid suspending media previously known for use in such light valves, depending upon considerations such as the intended application and/or the operating parameters of the light valve. Such "prior art" media include, but are not limited to, those disclosed in U.S. Pat. Nos. 4,247,175; 4,407,565; 4,772,103; 5,409,734; 5,461,506 and 5,463,492. In general, one or both of the liquid suspending medium or the polymeric stabilizer (described below) dissolved in the medium is chosen so as to maintain the suspended particles in gravitational equilibrium.

The polymeric stabilizer, when employed, may be a single type of solid polymer that bonds to the surface of the particles but which also dissolves in the non-aqueous liquid (s) of the liquid suspending medium. Alternatively, there may be two or more solid polymeric stabilizers serving as a polymeric stabilizer system. For example, the particles can be coated with a first type of solid polymeric stabilizer such as nitrocellulose which, in effect, provides a plain surface coating for the particles, together with one or more additional types of solid polymeric stabilizer that bond to or associate with the first type of solid polymeric stabilizer and which also dissolve in the liquid suspending medium to provide dispersion and steric protection for the particles. Also, liquid polymeric stabilizers may be used to advantage, especially in SPD light valve films, as described for example in U.S. Pat. No. 5,463,492.

Inorganic and organic particles may be used in a light valve suspension, and such particles may be either light-absorbing or light-reflecting in the visible portion of the electromagnetic spectrum.

Conventional SPD light valves have generally employed particles of colloidal size. As used herein the term "colloidal" means that the particles generally have a largest dimension averaging about 1 micron or less. Preferably, most polyhalide or non-polyhalide types of particles used or intended for use in an SPD light valve suspension will have a largest dimension which averages 0.3 micron or less and more preferably averages less than one-half of the wavelength of blue light, i.e., less than 2000 Angstroms, to keep light scatter extremely low.

As used herein, the term "decay time" means the time needed for an SPD film, after the power to the device is turned off, to change from 90% to 10% of its light transmission in the activated (ON) state. The term "rise time", as that term is used herein, is the time needed, after the power is turned on, for the film to change from 10% to 90% of its light transmission in the activated state. It should be noted that 100% of the film's light transmission in its activated state need not be its maximum possible light transmission but can be whatever amount of light transmission is chosen by the user as convenient in view of the voltage, frequency and/or other parameters the user chooses to employ. Generally the rise time is two to three times faster than the decay time because the rise time is a function of the electric field produced by the applied voltage, whereas the decay time is usually determined by Brownian Movement.

As additionally used herein, a "fast" decay time is 250 milliseconds or less at 25° C., preferably 0.100 milliseconds or less at 25° C. Moreover, as also used herein, a "very fast" decay time is 50 milliseconds or less at 25° C. and preferably 20 milliseconds or less at 25° C. When added together, the rise time and decay time of the SPD film constitute the film's "response time" as the term is used herein. As a practical matter, reducing the decay time has the effect of also reducing both the rise time and overall response time of the film.

Depending on the intended application, it may be desirable for an SPD film to have a response time that is fast or not. In order to achieve the desired speed, it is desirable to have a wide choice of liquid suspending media so that liquids having many different viscosities are available because, in addition to other factors, the rise time, decay time and response time of a liquid suspension is each a function of the suspension's viscosity, which is generally a function of the viscosity of the liquid suspending medium or media of the suspension. That is, if other factors are constant, the rise time, decay time and response time of a liquid suspension will all increase if the viscosity of its liquid suspending medium is increased, and conversely all of these times will decrease if the viscosity of the suspending medium is reduced.

A wide variety of liquids, both non-polymeric and polymeric, have been suggested in the prior art for use as the liquid suspending medium of an SPD light valve, or at least as a component thereof. The non-polymeric liquids include, without limitation, a variety of halogenated liquids, lower esters and plasticizers. Polymeric liquids previously disclosed include, without limitation, the polymeric liquid copolymers mentioned in U.S. Pat. No. 5,463,492 and polydimethylsiloxane.

In order for a liquid to be useful as a liquid suspending medium (or a component thereof) in a droplet of an SPD film, the liquid must (a) be substantially or completely immiscible with the matrix polymer used in forming the film, even at elevated temperature, e.g., 90° C.; (b) have a reasonably high boiling point (greater than 100° C., preferably greater than 150° C., and more preferably greater than 200° C.) at atmospheric pressure; be liquid at 25° C. and preferably at 0° C. and more preferably at −20° C. and below. Moreover, the liquid suspending medium as a whole should have an index of refraction that differs from the index of refraction of the matrix polymer by 0.002 units or less, preferably by 0.001 units or less at 25° C. In addition, the liquid should have an electrical resistivity of at least $0.8\times10^6$ ohms per square and preferably greater than $5\times10^6$ ohms per square. Some liquid suspending media have electrical resistivities of $10^{12}$ ohms per square or more.

If an SPD film is of the type made by phase separation from a homogeneous solution (as described for example in U.S. Pat. No. 5,409,734), then the liquid suspending medium of the droplet should be immiscible with the precipitated (phase separated) matrix polymer. If the SPD film is of the type where the film is formed by cross-linking (i.e., radiation curing or heat curing) the matrix, then the liquid suspending medium needs to be immiscible with both the uncured and the cured film.

The present invention is directed to improved films for use in suspended particle devices such as light valves. In particular, the invention is directed to new suspending media for use in forming such films, as well as to SPD light valves incorporating the improved films of the invention.

SUMMARY OF THE INVENTION

The present invention provides a film suitable for use as a light-modulating unit of a suspended particle device ("SPD") light valve. The film comprises a matrix polymer material having droplets of a liquid light valve suspension medium dispersed within the matrix. The liquid light valve suspension medium is (a) substantially immiscible with the matrix polymer material, (b) has a boiling point at atmospheric pressure greater than about 100° C., (c) has an electrical resistivity of at least about $0.8\times10^6$ ohms per square, and (d) has an index of refraction at 25° C. which differs from an index of refraction of the matrix polymer at substantially the same temperature by no more than about 0.002. The liquid suspending medium comprises at least one liquid component selected from the group consisting of methyl pyrrolidinone, ethyl pyrrolidinone, dimethyl malonate, diethyl malonate, dimethyl succinate, di(propylene glycol)methyl ether, dimethyl phthalate, butyl phthalyl butyl glycolate, ethyl lactate, propylene carbonate, dimethyl perfluorosuberate, dimethyl tetrafluorosuccinate, tetra(ethylene glycol)dimethyl ether, tri(ethylene glycol) dimethyl ether, di(ethylene glycol)dimethyl ether, ethylene glycol phenyl ether, epoxidized linseed oil, epoxidized soy oil, diethylisophthalate, a silicone copolyol-based laurate ester, a silicone copolyol copolymer, a silicone copolyol ester, a silicone copolyol-based isostearate ester, a silicone copolyol-based pelargonate ester, diethylisophthalate, dimethyl octofluoroadipate, and mixtures thereof.

For certain applications and/or under certain operating conditions, the liquid suspending medium for use with a light valve according to the invention may include, in addition to at least one of the liquids set forth above, one or more "prior art" liquid suspending media known to one skilled in this art. For example, without limitation, prior art suspending media may be used to adjust the viscosity or refractive index of the overall liquid suspending media in which they are incorporated. Such "prior art" media components, however, must also meet the requirements for minimum boiling point and immiscibility as set forth above.

The invention additionally provides, in another embodiment a film suitable for use as a light-modulating unit of a suspended particle device light valve wherein the film comprises a matrix polymer material which is cross-linked in forming the film to produce a cross-linked polymer matrix. The film has droplets of a liquid light-valve suspension dispersed within the cross-linked matrix. The liquid light-valve suspension medium is (a) substantially immiscible with the matrix polymer material, (b) has a boiling point at atmospheric pressure greater than about 100° C., (c) has an electrical resistivity of at least about $0.8\times10^6$ ohms per square, and (d) has an index of refraction at 25° C. which differs from an index of refraction of the matrix polymer at substantially the same temperature by no more than about 0.002. The suspending medium comprises at least one liquid component selected from the group consisting of methyl pyrrolidinone, ethyl pyrrolidinone, dimethyl malonate, diethyl malonate, dimethyl succinate, di(propylene glycol) methyl ether, dimethyl phthalate, butyl phthalyl butyl glycolate, ethyl lactate, propylene carbonate, dimethyl perfluorosuberate, dimethyl tetrafluorosuccciate, tetra (ethylene glycol)dimethyl ether, tri(ethylene glycol) dimethyl ether, di(ethylene glycol)dimethyl ether, ethylene glycol phenyl ether, epoxidized linseed oil, epoxidized soy oil, diethylisophthalate, a silicone copolyol-based laurate ester, a silicone copolyol copolymer, a silicone copolyol ester, a silicone copolyol-based isostearate ester, a silicone copolyol-based pelargonate ester, diethylisophthalate, dimethyl octofluoroadipate, and mixtures thereof.

For certain applications and/or under certain operating conditions, as discussed above, the liquid suspending medium for use with a light valve according to the invention may include, in addition to at least one of the liquids set forth above, one or more "prior art" liquid suspending media known to one skilled in this art. Such "prior art" media components, however, must also meet the requirements for minimum boiling point and immiscibility set forth above.

The invention further provides an electro-optical device for controlling the transmission of radiation. The device comprises a cell formed of opposed cell walls, a light-modulating element located between the cell walls and opposed electrode means operatively associated with the cell walls. The light modulating element comprises a film comprised of a matrix polymer material and having droplets of a liquid light-valve suspension medium dispersed within the polymer matrix. The electrode means are adapted for applying an electrical field across the suspension. The liquid suspending medium (a) is substantially immiscible with the matrix polymer material, (b) has a boiling point at atmospheric pressure greater than about 100° C., (c) has an electrical resistivity of at least about $0.8 \times 10^6$ ohms per square, and (d) has an index of refraction at 25° C. which differs from an index of refraction of the matrix polymer at substantially the same temperature by no more than about 0.002, and wherein the suspension medium comprises at least one liquid component selected from the group consisting of methyl pyrrolidinone, ethyl pyrrolidinone, dimethyl malonate, diethyl malonate, dimethyl succinate, di(propylene glycol)methyl ether, dimethyl phthalate, butyl phthalyl butyl glycolate, ethyl lactate, propylene carbonate, dimethyl perfluorosuberate, dimethyl tetrafluorosuccciate, tetra(ethylene glycol)dimethyl ether, tri(ethylene glycol) dimethyl ether, di(ethylene glycol)dimethyl ether, ethylene glycol phenyl ether, epoxidized linseed oil, epoxidized soy oil, diethylisophthalate, a silicone copolyol-based laurate ester, a silicone copolyol copolymer, a silicone copolyol ester, a silicone copolyol-based isostearate ester, a silicone copolyol-based pelargonate ester, diethylisophthalate, dimethyl octofluoroadipate, and mixtures thereof.

For certain applications and/or under certain operating conditions, as discussed above, the liquid suspending medium for use with a light valve according to the invention may include, in addition to at least one of the liquids set forth above, one or more "prior art" liquid suspending media known to one skilled in this art. Such "prior art" media components, however, must also meet the requirements for minimum boiling point and immiscibility set forth above.

The invention further provides a method of preparing a film suitable for use as a light-modulating unit of a suspended particle device light valve according to the invention. The method entails preparing a quantity of a matrix polymer material and forming an emulsion from the combination of at least a portion of the matrix polymer material and a quantity of a liquid light valve suspension. The suspension comprises a plurality of particles suspended in a liquid suspending medium, wherein the liquid suspending medium (a) is substantially immiscible with the matrix polymer material, (b) has a boiling point at atmospheric pressure greater than about 100° C., (c) has an electrical resistivity of at least about $0.8 \times 10^6$ ohms per square, and (d) has an index of refraction at 25° C. which differs from an index of refraction of the matrix polymer at substantially the same temperature by no more than about 0.002. The suspending medium comprises at least one liquid component selected from the group consisting of methyl pyrrolidinone, ethyl pyrrolidinone, dimethyl malonate, diethyl malonate, dimethyl succinate, di(propylene glycol)methyl ether, dimethyl phthalate, butyl phthalyl butyl glycolate, ethyl lactate, propylene carbonate, dimethyl perfluorosuberate, dimethyl tetrafluorosuccciate, tetra(ethylene glycol)dimethyl ether, tri (ethylene glycol)dimethyl ether, di(ethylene glycol)dimethyl ether, ethylene glycol phenyl ether, epoxidized linseed oil, epoxidized soy oil, diethylisophthalate, a silicone copolyol-based laurate ester, a silicone copolyol copolymer, a silicone copolyol ester, a silicone copolyol-based isostearate ester, a silicone copolyol-based pelargonate ester, diethylisophthalate, dimethyl octofluoroadipate, and mixtures thereof.

As in the case of the compositions described above, for certain applications and/or under certain operating conditions, as discussed above, the liquid suspending medium for use with a light valve according to the invention may include, in addition to at least one of the liquids set forth above, one or more "prior art" liquid suspending media known to one skilled in this art. Such "prior art" media components, however, must also meet the requirements for minimum boiling point and immiscibility set forth above.

The method of the invention additionally comprises cross-linking the polymer matrix to solidify the matrix polymer and produce a film having droplets of the liquid light valve suspension distributed in the cross-linked polymer matrix.

DETAILED DESCRIPTION OF THE INVENTION

The present invention is directed to a number of liquid formulations, not previously taught for use in suspended particle devices, that can be used alone or in combination with one another either as the liquid suspending medium of the droplets for an SPD film, or as a component of such a medium, wherein the remainder of the medium is composed of one or more "prior art" liquid suspending media as described above. These new liquid materials are set forth below in Table 1. When a category of liquid is listed, e.g., without limitation thereto, Lambent MFF 159-100, it should be understood that the present invention comprises only members of that category which are liquid and which meet the requirements for minimum boiling point and immiscibility with the matrix polymer of the SPD film described elsewhere herein. Preferably, the refractive index of the matrix material should be within the range of refractive indices of the liquids set forth in Table 1 (i.e., ranging between about 1.3384–1.5339 @ 25° C.).

Liquids listed in Table 1 with the designation "LAMBENT" comprise silicone copolyol-based fatty acid esters, wetting agents and silicone copolyols sold by Lambent Technologies, Inc. of Norcross, Ga., as described, for example, in the Lambent Technologies, Inc. (Norcross Division) Product Guide and as set forth in the footnotes to the Table below.

TABLE 1

Properties of Liquids Useful in Light Valve Suspensions for SPD Films

| Liquid | Refractive Index | Viscosity (cps@25° C.) | Boiling Point (° C.) | Melting Point (° C.) | Resistivity (Mohm/sq.) |
|---|---|---|---|---|---|
| Methyl Pyrrolidinone | 1.4674@25° C. | 2 | 202 | −24 | 1.8 |
| Ethyl Pyrrolidinone | 1.4650@20° C. | 2 | 94/20 mm | <−40 | 2.3 |
| Dimethyl Malonate | 1.4130@20° C. | 2 | 181 | −62 | 6 |
| Diethyl Malonate | 1.4140@20° C. | 2 | 199 | −50 | 19.5 |
| Dimethyl Succinate | 1.4190@20° C. | 3 | 200 | 19 | 47.5 |
| Di(propylene glycol)methyl ether | 1.4189@25° C. | 4 | 190 | −80 | 6.5 |
| Dimethyl Phthalate | 1.5128@25° C. | 15 | 282 | 2 | 425 |
| Butyl Phthalyl Butyl Glycolate | 1.4870@25° C. | 63 | 220/10 mm | −20 | 1550 |
| Ethyl Lactate | 1.4130@20° C. | 3 | 154 | −26 | 1.5 |
| Propylene Carbonate | 1.4210@20° C. | 3 | 240 | −55 | 0.9 |
| Dimethyl Perfluorosuberate | 1.3384@25° C. | 10 | >140 | −3 | 80 |
| Dimethyl Octafluoroadipate | 1.3438@25° C. | 6 | 120/15 mm | −18 | 2 |
| Dimethyl Hexafluoroglutarate | 1.3486@25° C. | 4 | 100/34 mm | −31.8 | 3 |
| Dimethyl Tetrafluorosuccinate | 1.3540@25° C. | 3 | >140 | 8 | 0.8 |
| Lambent Wax WS-L[1] | 1.4519@25° C. | 194 | >100 | 0 | 15.5 |
| Lambent MFF-159-100[2] | 1.4539@25° C. | 190 | >100 | −3 | 13 |
| Lambent MFF-160[3] | 1.4492@25° C. | 1807 | >100 | −40 | 27 |
| Lambent 703[4] | 1.4495@25° C. | 99 | >100 | 0 | 10.5 |
| Lambent MFF-184SW[5] | 1.4519@25° C. | 200 | >100 | 0 | 26.5 |
| Lambent Wax WD-IS[6] | 1.4341@25° C. | 187 | >100 | 2 | 48 |
| Lambent MFF-164[7] | 1.4341@25° C. | 177 | >100 | −40 | 5.5 |
| Lambent Wax WS-P[8] | 1.4514@25° C. | 226 | >100 | −4 | 16 |
| Lambent MFF-199SW[9] | 1.4450@25° C. | 40 | >160 | −9 | 19 |
| Tetra(ethylene glycol)dimethyl ether | 1.4291@25° C. | 3 | 276 | −30 | 17 |
| Tri(ethylene glycol)dimethyl ether | 1.4230@20° C. | 3 | 216 | −45 | 45 |
| Di(ethylene glycol)dimethyl ether | 1.4080@20° C. | 1 | 162 | −68 | 35 |
| Ethylene glycol phenyl ether | 1.5339@25° C. | 23 | 247 | 14 | 9 |
| Epoxidized Linseed Oil | 1.4753@25° C. | 920 | >160 | 0 | 20000 |
| Epoxidized Soy Oil | 1.4716@25° C. | 67.5 | >160 | −20 | 55000 |
| Diethylisophthalate | 1.5037@25° C. | 16 | 166/10 mm | 12 | 11000 |

[1]LAMBENT-WAX WS-L is a silicone copolyol-based laurate ester.
[2]Lambent MFF 159-100 is a silicone copolyol copolymer.
[3]Lambent MFF 160 is a silicone copolyol copolymer.
[4]Lambent 703 is a silicone copolyol ester blend.
[5]Lambent MFF-184SW is a wetting agent.
[6]LAMBENT-WAX WD-IS is a silicone copolyol-based isostearate ester.
[7]Lambent MFF-164 is a silicone copolyol copolymer.
[8]Lambent Wax WS-P is a silicone copolyol-based pelargonate ester.
[9]Lambent MFF-199SW is a wetting agent.

As noted above, the liquid suspending media of the present invention may further include, i.e., in addition to at least one of the liquids set forth in Table 1 above, one or more liquid formulations used or suggested for use in an SPD light valve suspension in the prior art, and which meet the requirements for minimum boiling point and immiscibility with the matrix polymer of the SPD film described elsewhere herein.

Generally speaking, the liquid compositions useful in the present invention may be either non-polymeric liquids or polymeric liquids.

In a first embodiment the invention therefore comprises a film suitable for use as a light-modulating unit of a suspended particle device (SPD) light valve. The film is comprised of a matrix polymer material and has droplets of a liquid light valve suspension comprising a plurality of particles dispersed in a liquid suspending medium and distributed within the matrix. The liquid suspending medium (a) is substantially immiscible with the matrix polymer material, (b) has a boiling point at atmospheric pressure greater than about 100° C., (c) has an electrical resistivity of at least about $0.8 \times 10^6$ ohms per square, and (d) has an index of refraction at 25° C. which differs from an index of refraction of the matrix polymer at substantially the same temperature by no more than about 0.002. The suspension medium comprises at least one liquid component selected from the group consisting of methyl pyrrolidinone, ethyl pyrrolidinone, dimethyl malonate, diethyl malonate, dimethyl succinate, di(propylene glycol)methyl ether, dimethyl phthalate, butyl phthalyl butyl glycolate, ethyl lactate, propylene carbonate, dimethyl perfluorosuberate, dimethyl tetrafluorosuccinate, tetra(ethylene glycol)dimethyl ether, tri(ethylene glycol)dimethyl ether, di(ethylene glycol)dimethyl ether, ethylene glycol phenyl ether, epoxidized linseed oil, epoxidized soy oil, diethylisophthalate, a silicone copolyol-based laurate ester, a silicone copolyol copolymer, a silicone copolyol ester, a silicone copolyol-based isostearate ester, a silicone copolyol-based pelargonate ester, diethylisophthalate, dimethyl octofluoroadipate, and mixtures thereof.

In an alternate embodiment, for certain applications and/or under certain operating conditions, as discussed above, the liquid light valve suspension media may additionally include, i.e., in addition to one or more of the above-recited liquids, which are a required component of the invention, one or more "prior art" liquid suspending media known to one skilled in this art. Such media, however, must also meet the requirements for minimum boiling point and immiscibility set forth above.

In a further embodiment, the matrix polymer material is cross-linked in forming the film to produce a cross-linked polymer matrix.

In another embodiment, the liquid suspending medium incorporated within the film as described above has a boiling point at atmospheric pressure of greater than about 150° C. In a further embodiment the boiling point of the light valve suspension medium is at least about 200° C. at atmospheric pressure.

In yet another embodiment, the liquid light valve suspension of the invention has a decay time of about 250 milliseconds or less. In a further embodiment, the liquid light valve suspension has a decay time of about 100 milliseconds or less. In a further embodiment, the liquid light valve suspension has a decay time of about 50 milliseconds or less, and in a still further embodiment, the liquid light valve suspension has a decay time of about 20 milliseconds or less.

In another embodiment, the liquid suspending medium has a viscosity of from about 1 cps to about 1807 cps at 25° C. In another embodiment the liquid suspending medium has a viscosity of from about 5.5 cps to about 66.5 cps at 25° C.

In an additional embodiment of the invention, the matrix polymer material is selected from the group consisting of polybutadiene, polystyrene, polyacrylamide, polyester, polyether, polyurethane, polyorganosiloxane, polymethyl methacrylate, polyvinyl butyral, polyvinyl acetate, cellulose acetate and mixtures thereof.

In another embodiment, the invention is directed to a light valve comprising a pair of spaced-apart cell walls and a light-modulating element between the cell walls, wherein the light-modulating element comprises any of the films described above.

In a further embodiment the invention is directed to an electro-optical device for controlling the transmission of radiation. The device comprises a cell formed of opposed cell walls, a light-modulating element located between the cell walls and opposed electrode means operatively associated with the cell walls. The light modulating element comprises a film, which film comprises a polymer matrix material having droplets of a liquid suspending medium dispersed within the polymer matrix. The electrode means is adapted for applying an electrical field across the suspension. The liquid suspending medium (a) is substantially immiscible with the matrix polymer material, (b) has a boiling point at atmospheric pressure greater than about 100° C., (c) has an electrical resistivity of at least about $0.8 \times 10^6$ ohms per square, and (d) has an index of refraction at 25° C. which differs from an index of refraction of the matrix polymer at substantially the same temperature by no more than about 0.002. The suspending medium comprises at least one liquid component selected from the group consisting of methyl pyrrolidinone, ethyl pyrrolidinone, dimethyl malonate, diethyl malonate, dimethyl succinate, di(propylene glycol)methyl ether, dimethyl phthalate, butyl phthalyl butyl glycolate, ethyl lactate, propylene carbonate, dimethyl perfluorosuberate, dimethyl tetrafluorosuccinate, tetra(ethylene glycol)dimethyl ether, tri(ethylene glycol)dimethyl ether, di(ethylene glycol)dimethyl ether, ethylene glycol phenyl ether, epoxidized linseed oil, epoxidized soy oil, diethylisophthalate, a silicone copolyol-based laurate ester, a silicone copolyol copolymer, a silicone copolyol ester, a silicone copolyol-based isostearate ester, a silicone copolyol-based pelargonate ester, diethylisophthalate, dimethyl octofluoroadipate, and mixtures thereof. Optionally, as described above, the suspending medium may additionally comprise at least one "prior art" liquid suspension medium, i.e., as described in one of the patents noted above.

In a further embodiment of the electro-optical device as described above, the matrix polymer material is cross-linked in forming the film to produce a cross-linked matrix polymer.

In another embodiment, the boiling point of the liquid light valve suspension medium is at least about 150° C. at atmospheric pressure. In a more preferred embodiment, the boiling point of the liquid light valve suspension medium is at least about 200° C. at atmospheric pressure.

In a further embodiment, the liquid suspending medium of the electro-optical device has an index of refraction that differs from an index of refraction of the matrix polymer material by no more than about 0.001 units at 25° C. In another embodiment, the liquid suspending medium has an electrical resistivity of at least about $5 \times 10^6$ ohms per square. In a still further embodiment, the liquid suspending medium has a viscosity of from about 1 cps to about 1807 cps at 25° C. In a more preferred embodiment, the liquid suspending medium has a viscosity of from about 5.5 to about 66.5 cps at 25° C.

In a still further embodiment, the invention is directed to an electro-optical device wherein the matrix polymer comprises acryloxypropyl dimethoxymethyl silane and at least one of:

a) disilanol terminated poly(dimethylsiloxane);

b) disilanol terminated poly(diphenyldimethylsiloxane);

c) disilanol terminated poly(diphenylsiloxane);

d) dialkoxy terminated diphenyl silane; and e) methylphenyl dimethoxy silane.

In an alternate embodiment of the invention the matrix polymer within the electro-optical device comprises methacryloxylpropyl dimethyoxymethyl silane and at least one of:

a) disilanol terminated poly(dimethylsiloxane);

b) disilanol terminated poly(diphenyldimethylsiloxane);

c) disilanol terminated poly(diphenylsiloxane);

d) dialkoxy terminated diphenyl silane; and e) methylphenyl dimethoxy silane.

The invention is further directed, in another embodiment, to a method of preparing a film suitable for use as a light-modulating unit of a suspended particle device light valve. The method includes preparing a quantity of a matrix polymer material. The method further comprises forming an emulsion from the combination of at least a portion of the matrix polymer material and a quantity of a liquid light valve suspension comprising a plurality of particles suspended in a liquid suspending medium, wherein the liquid suspending medium (a) is substantially immiscible with the matrix polymer material, (b) has a boiling point at atmospheric pressure greater than about 100° C., (c) has an electrical resistivity of at least about $0.8 \times 10^6$ ohms per square, and (d) has an index of refraction at 25° C. which differs from an index of refraction of the matrix polymer at substantially the same temperature by no more than about 0.002. The suspending medium comprises at least one liquid component selected from the group consisting of methyl pyrrolidinone, ethyl pyrrolidinone, dimethyl malonate, diethyl malonate, dimethyl succinate, di(propylene glycol)methyl ether, dimethyl phthalate, butyl phthalyl butyl glycolate, ethyl lactate, propylene carbonate, dimethyl perfluorosuberate, dimethyl tetrafluorosuccinate, tetra(ethylene glycol)dimethyl ether, tri (ethylene glycol)dimethyl ether, di(ethylene glycol)dimethyl ether, ethylene glycol phenyl ether, epoxidized linseed oil, epoxidized soy oil, diethylisophthalate, a silicone copolyol-based laurate ester, a silicone copolyol copolymer, a silicone copolyol ester, a silicone copolyol-based isostearate ester, a silicone copolyol-based pelargonate ester, diethylisophthalate, dimethyl octofluoroadipate, and mixtures thereof. If desired, as discussed above, the suspending medium may additionally include one or more known, i.e., "prior art" liquid suspension media. The polymer matrix is cross-linked to solidify the matrix polymer and produce a film having droplets of the liquid light valve suspension distributed in the cross-linked polymer matrix.

In a further embodiment of the method of the invention, the polymer matrix is cross-linked by exposing the matrix polymer emulsion to a sufficient amount of heat or radiation for a sufficient duration to at least substantially convert the emulsion into a film. In the event that radiation is used for such curing, examples of useful types of radiation include, but are not limited to electron beam radiation and ultraviolet radiation. Alternately, as noted above, the polymer matrix may be cured by exposure to heat. A catalyst or photoinitiator may optionally be added to the emulsion in order to facilitate such thermal or radiation cross-linking, respectively, of the polymer matrix.

It has been determined that in order to achieve a fast decay time, i.e., a decay time of 250 milliseconds or less for a liquid suspension using only a moderate amount of suspending polymer and having colloidal particles whose largest dimension averages about 0.3 micron, one must generally use a liquid suspending medium (which may comprise either a single liquid or a mixture of two or more liquids) which has a viscosity at 25° C. of 66.5 centipoises or less. To achieve a decay time of 100 milliseconds or less, the liquid suspending medium should have a viscosity of 27 centipoises or less. To achieve a very fast decay time, i.e., a decay time at 25° C. of 50 milliseconds or less, the liquid suspending medium should have a viscosity of 13.5 centipoises. To achieve a decay time of 20 milliseconds or less, the liquid suspending medium should have a viscosity of about 5.5 centipoises. However, for suspensions comprising smaller particles, e.g., particles which have a largest dimension that averages about 0.2 micron, commensurately more viscous liquid suspending media can achieve the aforesaid decay times, because the smaller particles are more affected by collisions with the moving liquid molecules, i.e., via the phenomenon known as Brownian Movement.

Further to the above, a large number and variety of matrix polymers have been disclosed in the prior art for use in SPD films. For example, without limitation thereto, in U.S. Pat. No. 5,463,491 cross-linked polybutadiene, polystyrene, polyacrylamide, polyester, polyether, polyurethane and polyorganosiloxane have been disclosed. In U.S. Pat. No. 5,409,734 uncross-linked polymethyl methacrylate, polyvinyl butyral, polyvinyl acetate and cellulose acetate have been disclosed as possible polymeric matrices.

Two specific non-limiting examples of polyorganosiloxane-type matrices of particular utility in forming SPD devices in accordance with the present invention are provided below. One matrix polymer is a condensation copolymer comprising by weight approximately (1) 14.3% poly(dimethylsiloxane), disilanol terminated, (2) 77.5% poly(diphenyl dimethylsiloxane, of which the diphenylsiloxane comprises 14% to 18% by weight, and the dimethylsiloxane is the remainder), disilanol terminated and (3) 8.2% of 3-acryloxypropyldimethoxymethyl-silane. The other matrix polymer is a condensation copolymer comprising the same monomers in the same percentages, but having a lower viscosity.

Because of wide differences in polarity and solubility among useful matrix polymers, any of the liquids used in forming the liquid suspending media according to the invention may be miscible or immiscible with a particular matrix polymer, as the case may be. The present invention, however, comprises only liquids and polymer matrices which are immiscible. Such immiscibility can be empirically determined quite readily without any undue experimentation by one of ordinary skill in this art.

For certain applications, including but not limited to certain types of flat panel displays and eyewear, it may be desirable for an SPD film to have a fast or very fast decay time. In order to achieve a fast or very fast decay time, the liquid suspension should have a relatively low viscosity. The viscosity of a liquid suspension is primarily a function of (a) the viscosity of the suspension's liquid suspending medium and (b) the type and amount of any polymer dissolved in the liquid suspending medium to disperse the suspended particles therein. The decay time is also a function of the size of the suspended particles. For suspensions comprising particles which have a largest dimension averaging about 0.3 micron or less, a fast decay time or very fast decay time, as defined herein above, may generally be achieved if the viscosity of the liquid suspending medium is in the range of about 5.5 to 66.5 cps at 25° C. A significant number of the liquids listed in Table 1 meet this criterion, either alone or in combination with other liquids chosen from the same group and/or from prior art liquid suspension formulations.

All of the patents and other references cited herein are incorporated into this application by reference thereto to the degree necessary to completely understand the invention.

What is claimed is:

1. A film suitable for use as a light-modulating unit of suspended particle device (SPD) light valve, said film comprising a matrix polymer material and having droplets of a liquid light valve suspension comprising a plurality of particles dispersed in a liquid suspending medium distributed within the matrix, wherein said liquid suspending medium (a) is substantially immiscible with the matrix polymer material, (b) has a boiling point at atmospheric pressure greater than about 100° C., (c) has an electrical resistivity of at least about $0.8 \times 10^6$ ohms per square, and (d) has an index of refraction at 25° C. which differs from an index of refraction of the matrix polymer at substantially the same temperature by no more than about 0.002, and wherein said suspending medium comprises at least one liquid component selected from the group consisting of methyl pyrrolidinone, ethyl pyrrolidinone, dimethyl malonate, diethyl malonate, dimethyl succinate, di(propylene glycol) methyl ether, dimethyl phthalate, butyl phthalyl butyl glycolate, ethyl lactate, propylene carbonate, dimethyl tetrafluorosuccinate, tetra(ethylene glycol)dimethyl ether, tri(ethylene glycol) dimethyl ether, di(ethylene glycol) dimethyl ether, ethylene glycol phenyl ether, epoxidized linseed oil, epoxidized soy oil, diethylisophthalate, a silicone copolyol-based laurate ester, a silicone copolyol copolymer, a silicone copolyol ester, a silicone copolyol-based isostearate ester, a silicone copolyol-based pelargonate ester, dimethyl octofluoroadipate, and mixtures thereof.

2. The film according to claim 1, wherein the liquid suspending medium has a boiling point at atmospheric pressure greater than bout 150° C.

3. The film according to claim 2, wherein the boiling point of said liquid suspending medium is at least about 200° C. at atmospheric pressure.

4. The film according to claim 1, wherein the liquid light valve suspension has a decay time of less than about 250 milliseconds.

5. The film according to claim 4, wherein the liquid light valve suspension has a decay time of less than about 100 milliseconds.

6. The film according to claim 1, wherein the liquid suspending medium has a viscosity of from about 1 cps to about 1807 cps at 25° C.

7. The film according to claim 6, wherein the liquid suspending medium has a viscosity of from about 5.5 cps to about 66.5 cps at 25° C.

8. The film according to claim 1, wherein the matrix polymer material is cross-linked in forming said film to produce a cross-linked polymer matrix.

9. The film according to claim 1, wherein said matrix polymer material is selected from the group consisting of polybutadiene, polystyrene, polyacrylamide, polyester, polyether, polyurethane, polyorganosiloxane, polymethyl methacrylate, polyvinyl butyral, polyvinyl acetate, cellulose acetate and mixtures thereof.

10. A light valve comprising a pair of opposed spaced-apart cell walls and a light-modulating element between said cell walls, wherein said light-modulating element comprises the film according to claim 1.

11. An electro-optical device for controlling the transmission of radiation, said device comprising a cell formed of opposed cell walls, a light-modulating element between said cell walls and opposed electrode means operatively associated with said cell walls, said light-modulating element comprising a film, said film comprising a matrix polymer material and having droplets of a liquid light valve suspension comprising a plurality of particles dispersed in a liquid suspending medium distributed within the polymer matrix, said electrode means adapted for applying an electrical field across said suspension, wherein said liquid suspending medium (a) is substantially immiscible with the matrix polymer material, (b) has a boiling point at atmospheric pressure greater than about 100° C., (c) has an electrical resistivity of at least out $0.8 \times 10^6$ ohms per square, and (d) has an index of refraction at 25° C. which differs from an index of refraction of the matrix polymer at substantially the same temperature by no more than about 0.002, and wherein said suspending medium comprises at least one liquid component selected from the group consisting of methyl pyrrolidinone, ethyl pyrrolidinone, dimethyl malonate, diethyl malonate, dimethyl succinate, di(propylene glycol) methyl ether, dimethyl phthalate, butyl phthalyl butyl glycolate, ethyl lactate, propylene carbonate, dimethyl tetrafluorosuccinate, tetra(ethylene glycol)dimethyl ether, tri(ethylene glycol)dimethyl ether, di(ethylene glycol) dimethyl ether, ethylene glycol phenyl ether, epoxidized linseed oil, epoxidized soy oil, diethylisophthalate, a silicone copolyol-based laurate ester, a silicone copolyol copolymer, a silicone copolyol ester, a silicone copolyol-based isostearate ester, a silicone copolyol-based pelargonate ester, dimethyl octofluoroadipate, and mixtures thereof.

12. The electro-optical device according to claim 11, wherein the boiling point of said liquid suspending medium is at least about 150° C. at atmospheric pressure.

13. The electro-optical device according to claim 12, wherein the boiling point of said liquid suspending medium is at least about 200° C. at atmospheric pressure.

14. The electro-optical device according to claim 11, wherein the liquid suspending medium has a viscosity of from 1 cps to about 1807 cps at 25° C.

15. The electro-optical device according to claim 14, wherein the liquid suspending medium has a viscosity of from about 5.5 to about 66.5 cps at 25° C.

16. The electro-optical device according to claim 11, wherein the matrix polymer material is cross-linked in forming said film to produce a cross-linked polymer matrix.

17. The electro-optical device according to claim 11, wherein the liquid suspending medium has an index of refraction that differs from an index of refraction of the matrix polymer material by no more than about 0.001 units at 25° C.

18. The electro-optical device according to claim 11, wherein the liquid suspending medium has an electrical resistivity of at least about $5 \times 10^6$ ohms per square.

19. The electro-optical device according to claim 11, wherein said matrix polymer comprises acryloxypropyl dimethoxymethyl silane and at least one of:
 a) disilanol terminated poly(dimethylsiloxane);
 b) disilanol terminated poly(diphenyldimethylsiloxane);
 c) disilanol terminated poly(diphenylsiloxane);
 d) dialkoxy terminated diphenyl silane; and
 e) methyiphenyl dimethoxy silane.

20. The electro-optical device according to claim 11, wherein said matrix polymer comprises methacryloxyipropyl dimethyoxymethyl silane and at least one of:
 a) disilanol terminated poly(dimethylsiloxane);
 b) disilanol terminated poly(dipbenyldimethylsiloxane);
 c) disilanol terminated poly(diphenylsiloxane);
 d) dialkoxy terminated diphenyl silane; and
 e) methyiphenyl dimethoxy silane.

21. A film suitable for use as a light-modulating unit of a suspended particle device (SPD) light valve, said film comprising a matrix polymer material and having droplets of a liquid light valve suspension comprising a plurality of particles dispersed in a liquid suspending medium distributed within the matrix, wherein said liquid suspending medium (a) is substantially immiscible with the matrix polymer material, (b) has a boiling point at atmospheric pressure greater than about 100° C., (c) has an electrical resistivity of at least about $0.8 \times 10^6$ ohms per square, (d) has an index of refraction at 25° C. which differs from an index of refraction of the matrix polymer at substantially the same temperature by no more than about 0.002, and (e) has a viscosity of from about 5.5 cps to about 66.5 cps at 25° C., and wherein said suspending medium comprises at least one liquid component selected from the group consisting of methyl pyrrolidinone, ethyl pyrrolidinone, dimethyl malonate, diethyl malonate, dimethyl succinate, di(propylene glycol)methyl ether, dimethyl phthalate, butyl phthalyl butyl glycolate, ethyl lactate, propylene carbonate, dimethyl perfluorosuberate, dimethyl tetrafluorosuccinate, tetra(ethylene glycol)dimethyl ether, tri(ethylene glycol) dimethyl ether, di(ethylene glycol)dimethyl ether, ethylene glycol phenyl ether, epoxidized linseed oil, epoxidized soy oil, diethylisophthalate, a silicone copolyol-based laurate ester, a silicone copolyol copolymer, a silicone copolyol ester, a silicone copolyol-based isostearate ester, a silicone copolyol-based pelargonate ester, dimethyl octofluoroadipate, and mixtures thereof.

22. The film according to claim 21, wherein the matrix polymer material is cross-linked in forming said film to produce a cross-linked polymer matrix.

23. An electro-optical device for controlling the transmission of radiation, said device comprising a cell formed of opposed cell walls, a light-modulating element between said cell walls and opposed electrode means operatively associated with said cell walls, said light-modulating element comprising a film, said film comprising a matrix polymer material and having droplets of a liquid light valve suspension comprising a plurality of particles dispersed in a liquid suspending medium distributed within the polymer matrix, said electrode means adapted for applying an electrical field across said suspension, wherein said liquid suspending medium (a) is substantially immiscible with the matrix polyer material, (b) has a boiling point at atmospheric pressure greater than about 100° C., (c) has an electrical resistivity of at least about $0.8 \times 10^6$ ohms per square, (d) has an index of refraction at 25° C. which differs from an index of refraction of the matrix polymer at substantially the same temperature by no more than about 0.002, and (e) has a viscosity of from about 5.5 cps to about 66.5 cps at 25° C., and wherein said suspending medium comprises at least one liquid component selected from the group consisting of methyl pyrrolidinone, ethyl pyrrolidinone, dimethyl malonate, diethyl malonate, dimethyl succinate, di(propylene glycol) methyl ether, dimethyl phthalate, butyl phthalyl butyl glycolate, ethyl lactate, propylene carbonate, dimethyl perfluorosuberate, dimethyl tetrafluorosuccinate, tetra(ethylene glycol)dimethyl ether, tri(ethylene glycol) dimethyl ether, di(ethylene glycol)dimethyl ether, ethylene glycol phenyl ether, epoxidized linseed oil, epoxidized soy oil, diethylisophthalate, a silicone copolyol-based laurate ester, a silicone copolyol copolymer, a silicone copolyol ester, a silicone copolyol-based isostearate ester, a silicone copolyol-based pelargonate ester, dimethyl octofluoroadipate, and mixtures thereof.

24. The electro-optical device according to claim 23, wherein the matrix polymer material is cross-linked in forming said film to produce a cross-linked polymer matrix.

* * * * *